(12) United States Patent
Matsuura et al.

(10) Patent No.: US 8,533,520 B2
(45) Date of Patent: Sep. 10, 2013

(54) ELECTRONIC DEVICE, METHOD FOR CONTROLLING ELECTRONIC DEVICE, AND RECORDING MEDIUM

(75) Inventors: Sachio Matsuura, Kanagawa (JP); Shinichi Miura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 477 days.

(21) Appl. No.: 12/551,075

(22) Filed: Aug. 31, 2009

(65) Prior Publication Data

US 2010/0064157 A1    Mar. 11, 2010

(30) Foreign Application Priority Data

Sep. 9, 2008    (JP) .................................. 2008-231335

(51) Int. Cl.
*G06F 1/04*    (2006.01)

(52) U.S. Cl.
USPC ........... 713/502; 713/300; 713/310; 713/320; 340/7.38

(58) Field of Classification Search
USPC ................. 713/300, 323, 324, 502; 340/7.38
See application file for complete search history.

(56) References Cited

U.S. PATENT DOCUMENTS

| | | | | |
|---|---|---|---|---|
| 4,665,536 A * | 5/1987 | Kim | ................................ | 713/321 |
| 4,860,005 A * | 8/1989 | DeLuca et al. | ................ | 340/7.38 |
| 5,091,939 A * | 2/1992 | Cole et al. | ...................... | 713/183 |
| 5,278,771 A * | 1/1994 | Nyenya | .......................... | 700/293 |
| 5,504,907 A * | 4/1996 | Stewart et al. | ................. | 713/324 |
| 5,542,035 A * | 7/1996 | Kikinis et al. | ................. | 713/323 |
| 5,566,340 A * | 10/1996 | Stewart et al. | ................. | 713/323 |
| 5,579,252 A * | 11/1996 | Huang | .......................... | 713/321 |
| 5,768,604 A * | 6/1998 | Yamazaki et al. | ............. | 713/323 |
| 5,894,580 A * | 4/1999 | Yoshida | ......................... | 713/340 |
| 6,193,422 B1 * | 2/2001 | Belt et al. | ...................... | 713/320 |
| 6,516,421 B1 * | 2/2003 | Peters | ........................... | 713/502 |
| 6,618,810 B1 * | 9/2003 | Dirie | .............................. | 726/27 |
| 6,865,683 B2 * | 3/2005 | Taylor et al. | .................. | 713/310 |
| 6,885,974 B2 * | 4/2005 | Holle | ............................ | 702/182 |

(Continued)

FOREIGN PATENT DOCUMENTS

| | | |
|---|---|---|
| JP | 2004-213170 | 7/2004 |
| JP | 2004-284280 | 10/2004 |
| JP | 2005-153226 | 6/2005 |
| JP | 2007-282117 | 10/2007 |

OTHER PUBLICATIONS

EnviProt. Auto Shutdown Manager. Manual. 2013.*

(Continued)

*Primary Examiner* — Matthew D Spittle
(74) *Attorney, Agent, or Firm* — Oblon, Spivak, McClelland, Maier & Neustadt, L.L.P.

(57) ABSTRACT

When a user presses down an extension directing button, a control unit of an image forming apparatus detects the press-down of the extension directing button and executes a setting process of new mode set time. In this case, the control unit calculates the new mode set time by adding extension time extracted from an extension time data storage unit to basic set time acquired from a basic set time data storage unit and records the new mode set time in a mode set time data storage unit. Then, when start of a sleep mode is detected, the control unit of the image forming apparatus records the basic set time, which is extracted from the basic set time data storage unit, in the mode set time data storage unit as new mode set time when the mode set time is extended.

8 Claims, 7 Drawing Sheets

(56) References Cited

U.S. PATENT DOCUMENTS

| | | | | |
|---|---|---|---|---|
| 7,082,373 | B2 * | 7/2006 | Holle | 702/60 |
| 7,389,434 | B2 * | 6/2008 | Switzer et al. | 713/320 |
| 7,437,578 | B2 * | 10/2008 | Menzl | 713/300 |
| 7,743,267 | B2 * | 6/2010 | Snyder et al. | 713/320 |
| 7,873,957 | B2 * | 1/2011 | Nallipogu et al. | 717/168 |
| 8,063,872 | B2 * | 11/2011 | Forstall et al. | 345/102 |
| 2003/0191973 | A1 * | 10/2003 | Johnson | 713/300 |
| 2008/0059990 | A1 * | 3/2008 | Marr et al. | 725/10 |

OTHER PUBLICATIONS

Milpower Source. SNMPv3 PC Auto Shutdown Application for M359. User's Manual. May 23, 2012.*

Cyber Power Systems. Switch Shutdown Service User Manual. 2005.*

Office Action issued Sep. 25, 2012 in Japanese Application No. 2008-231335.

* cited by examiner

ELECTRONIC DEVICE, METHOD FOR CONTROLLING ELECTRONIC DEVICE, AND RECORDING MEDIUM

BACKGROUND OF THE INVENTION

1. Field of the Invention

The present invention relates to an electronic device provided with an active mode, in which a directed process can be immediately executed, and a power saving mode, in which less power is consumed than the active mode, as operating modes and relates to a method for controlling the electronic device, etc.

2. Description of the Related Art

Recently, a mechanism that suppresses power consumption has been introduced in electronic devices. For example, electronic devices (for example, image forming apparatuses, etc.) provided with an active mode in which processing units are kept active so that processes directed by a user can be immediately executed and a sleep mode (power saving mode) in which consumed power is reduced by activating the processing units after directions are given have been invented. Such an image forming apparatus switches from the active mode to the sleep mode when predetermined time (mode set time), which is set in advance, elapses after a process such as a copying process or a printing process is finished. In the sleep mode, power supply to an image forming unit, which is not relevant to transmission and reception of directions of process execution, is stopped. When a direction of process execution is received in the sleep mode, the power supply is resumed. Then, after the image forming unit is recovered and becomes operable, an image forming process can be executed. Particularly, warm-up of the image forming unit is required in the image forming apparatus; therefore, it takes time until it is recovered from the sleep mode and the process becomes executable.

Therefore, the techniques aimed at reduction of waiting time and power saving in the image forming apparatuses have been studied. For example, Unexamined Japanese Patent Application KOKAI Publication No. 2005-153226 discloses an image forming apparatus which continuously supplies power to a reader/writer within weekly timer set time (power-distributed period) since image forming operations are frequently carried out in many cases and prioritizes an energy saving measure except the weekly timer set time (dormant period) since image forming operations are not frequently carried out. In such image forming apparatus, within the weekly timer set time, advancing power saving is difficult since power is continuously supplied. Therefore, in order to advance power saving, it is conceivable to set the mode set time of the image forming apparatus to the shortest time upon shipment. However, when the mode set time is short in this manner, the image forming apparatus is immediately changed to the sleep mode. In this case, a user who frequently uses the image forming apparatus intermittently waits over and over until the apparatus recovers from the sleep mode.

Therefore, the user sometimes changes the setting of the mode set time so that it becomes longer. However, when the mode set time is extended in this manner, not so much contribution for power saving is made by the sleep mode.

SUMMARY OF THE INVENTION

The present invention has been accomplished in view of the above described problems, and it is an object of the present invention to provide an electronic device capable of exerting energy saving effects more and a control method, etc. of the electronic device.

It is also an object to provide the electronic device capable of shortening the set time of a power saving mode and the control method, etc. of the electronic device without reducing convenience.

In order to achieve the above described objects, an electronic device according to a first aspect of the present invention is an electronic device comprising a control unit connected to a process executing unit executing a directed information process, a set time data storage unit recording data about mode set time taken until transition to a power saving mode consuming small power after the information process in the process executing unit is finished, a basic set time data storage unit recording data about basic set time, an extension time data storage unit recording data about extension time, and an operation unit; wherein the control unit has a mode control unit which measures the time elapsed from end of the information process and, when the elapsed time passes over the mode set time recorded in the set time data storage unit, causes the process executing unit to transition to the power saving mode;

an extension processing unit which, when an extension direction of the mode set time is detected via the operation unit, calculates extended mode set time by using the extension time recorded in the extension time data storage unit and records the calculated mode set time in the set time data storage unit; and a recovery processing unit which, when transition to the power saving mode is made in the case in which the extended mode set time is stored in the set time data storage unit, records the basic set time, which is recorded in the basic set time data storage unit, in the set time data storage unit.

The operation unit may include an extension directing button.

The extension time data storage unit may store data about unit extension time of the case in which the extension directing button is pressed down one time.

The extension processing unit may detect an extension direction when the extension directing button is pressed down, detect the number of times of the press-down when the extension directing button is pressed down, calculate the extension time by multiplying the number of times of the press-down by the unit extension time stored in the extension time data storage unit, and calculate the extended mode set time by adding the extension time to the basic set time.

The control unit may further have a basic set time changing unit which executes a changing process of changing the basic set time when a time changing direction is detected via the operation unit.

The control unit may be connected to an authentication data storage unit storing authentication data about an administrator who has authority to change the basic set time.

The basic set time changing unit may acquire authentication data of a user after the time changing direction is detected and, when the authentication data of the user matches the authentication data recorded in the authentication data storage unit, executes the changing process.

An electronic device according to a second aspect of the present invention is an electronic device switching an operating mode to a power saving mode when predetermined time elapses, the electronic device comprising:

a data storage unit storing mode set time which is waiting time taken until the operating mode is switched to the power saving mode;

an extension processing unit extending the mode set time by predetermined time and stores the extended mode set time in the data storage unit when an extension directing operation is carried out after end of an image formation process and before elapse of the mode set time;

a mode control unit switching the operating mode of the electronic device to the power saving mode when the mode set time elapses after end of the image formation process; and a recovery processing unit returning the mode set time to a reference value after the operating mode is switched to the power saving mode by the mode control unit.

When an extension directing button is pressed down, the extension processing unit may count the number of times of press-down of the extension directing button, acquire extension time corresponding to the number of times of the press-down, and extend the mode set time by the acquired extension time.

A method for controlling an electronic device according to a third aspect of the present invention is a method for controlling an electronic device comprising: a control unit connected to a process executing unit executing a directed information process, a set time data storage unit recording data about mode set time taken until transition to a power saving mode consuming small power after the information process in the process executing unit is finished, a basic set time data storage unit recording data about basic set time, an extension time data storage unit recording data about extension time, and an operation unit; wherein the control unit executes:

a mode control step of measuring the time elapsed from end of the information process and, when the elapsed time passes over the mode set time recorded in the set time data storage unit, causing the process executing unit to transition to the power saving mode;

an extension processing step of, when an extension direction of the mode set time is detected via the operation unit, calculating extended mode set time by using the extension time recorded in the extension time data storage unit and recording the calculated mode set time in the set time data storage unit; and a recovery processing step of, when transition to the power saving mode is made in the case in which the extended mode set time is stored in the set time data storage unit, recording the basic set time, which is recorded in the basic set time data storage unit, in the set time data storage unit.

The operation unit may include an extension directing button.

The extension time data storage unit may store data about unit extension time of the case in which the extension directing button is pressed down one time.

In the extension processing step, an extension direction may be detected when the extension directing button is pressed down, the number of times of the press-down may be detected when the extension directing button is pressed down, the extension time may be calculated by multiplying the number of times of the press-down by the unit extension time stored in the extension time data storage unit, and the extended mode set time may be calculated by adding the extension time to the basic set time.

A method for controlling an electronic device according to a fourth aspect of the present invention is a method for controlling an electronic device switching an operating mode to a power saving mode when predetermined time elapses, the control method comprising:

a step of storing mode set time which is waiting time taken until the operating mode is switched to the power saving mode;

an extension processing step of extending the mode set time by predetermined time and storing the extended mode set time when an extension directing operation is carried out after end of an image formation process and before elapse of the mode set time;

a mode control step of switching the operating mode of the electronic device to the power saving mode when the mode set time elapses after end of the image formation process; and a recovery processing step of returning the mode set time to a reference value after the operating mode is switched to the power saving mode in the mode control step.

In the extension processing step, when an extension directing button is pressed down, the number of times of press-down of the extension directing button may be counted, extension time corresponding to the number of times of the press-down may be acquired, and the mode set time may be extended by the acquired extension time.

A recording medium according to a fifth aspect of the present invention is a recording medium storing a control program of an electronic device comprising a control unit connected to a process executing unit executing a directed information process, a set time data storage unit recording data about mode set time taken until transition to a power saving mode consuming small power after the information process in the process executing unit is finished, a basic set time data storage unit recording data about basic set time, an extension time data storage unit recording data about extension time, and an operation unit; wherein the recording medium stores a program for causing the control unit to function as:

a mode control unit which measures the time elapsed from end of the information process and, when the elapsed time passes over the mode set time recorded in the set time data storage unit, causes the process executing unit to transition to the power saving mode;

an extension processing unit which, when an extension direction of the mode set time is detected via the operation unit, calculates extended mode set time by using the extension time recorded in the extension time data storage unit and records the calculated mode set time in the set time data storage unit; and a recovery processing unit which, when transition to the power saving mode is made in the case in which the extended mode set time is stored in the set time data storage unit, records the basic set time, which is recorded in the basic set time data storage unit, in the set time data storage unit.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS (First Embodiment)

Hereinafter, a first embodiment of the present invention will be explained with reference to FIG. 1 to FIG. 5. In the present embodiment, an image forming apparatus 10 which is an electronic device provided with, as operating modes, an active mode in which a directed process can be immediately executed and a sleep mode (power saving mode) in which consumed power is smaller than the active mode will be explained.

First, the active mode and the sleep mode will be explained. The image forming apparatus 10 has image forming units which operate for carrying out image forming processes. In the case of the active mode, power is supplied to the entire image forming units. Therefore, when an execution direction of an image forming process is received, the image forming apparatus 10 is capable of immediately executing the image forming process. In the case of the sleep mode, the power supply to the image forming units which are not relevant to signal transmission and reception is stopped. Therefore, the image forming apparatus 10 resumes the power supply thereto after an execution direction of an image forming process is received. Therefore, when the execution direction of the image forming process is received in the sleep mode, the image forming apparatus 10 becomes capable of executing the image forming process after the power supply is resumed and the image forming units become operable (after recovery time elapses).

Figure 3:
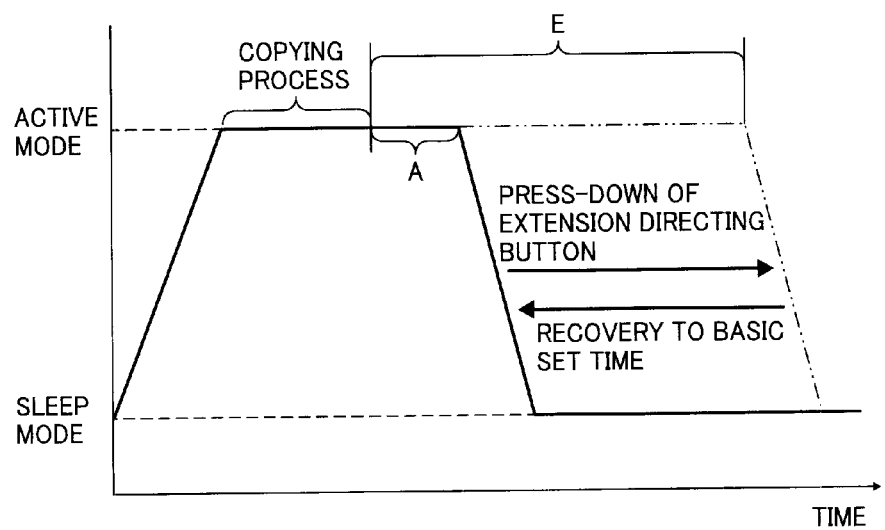
FIG. 3 is a conceptual diagram explaining the sleep mode time managing process in the first embodiment.

Furthermore, in the image forming apparatus 10 of the present embodiment, as shown in FIG. 3, after the image forming process of, for example, a copy process is finished, the active mode is maintained until certain waiting time (mode set time) elapses, and, after the elapse, the active mode is cancelled and transitioned to the sleep mode. Herein, basic set time A is always used as the mode set time. In the present embodiment, shortest time of the mode set time is set as the basic set time A. The mode set time can be temporarily extended by a direction of a user (Time E in FIG. 3).

Figure 1:
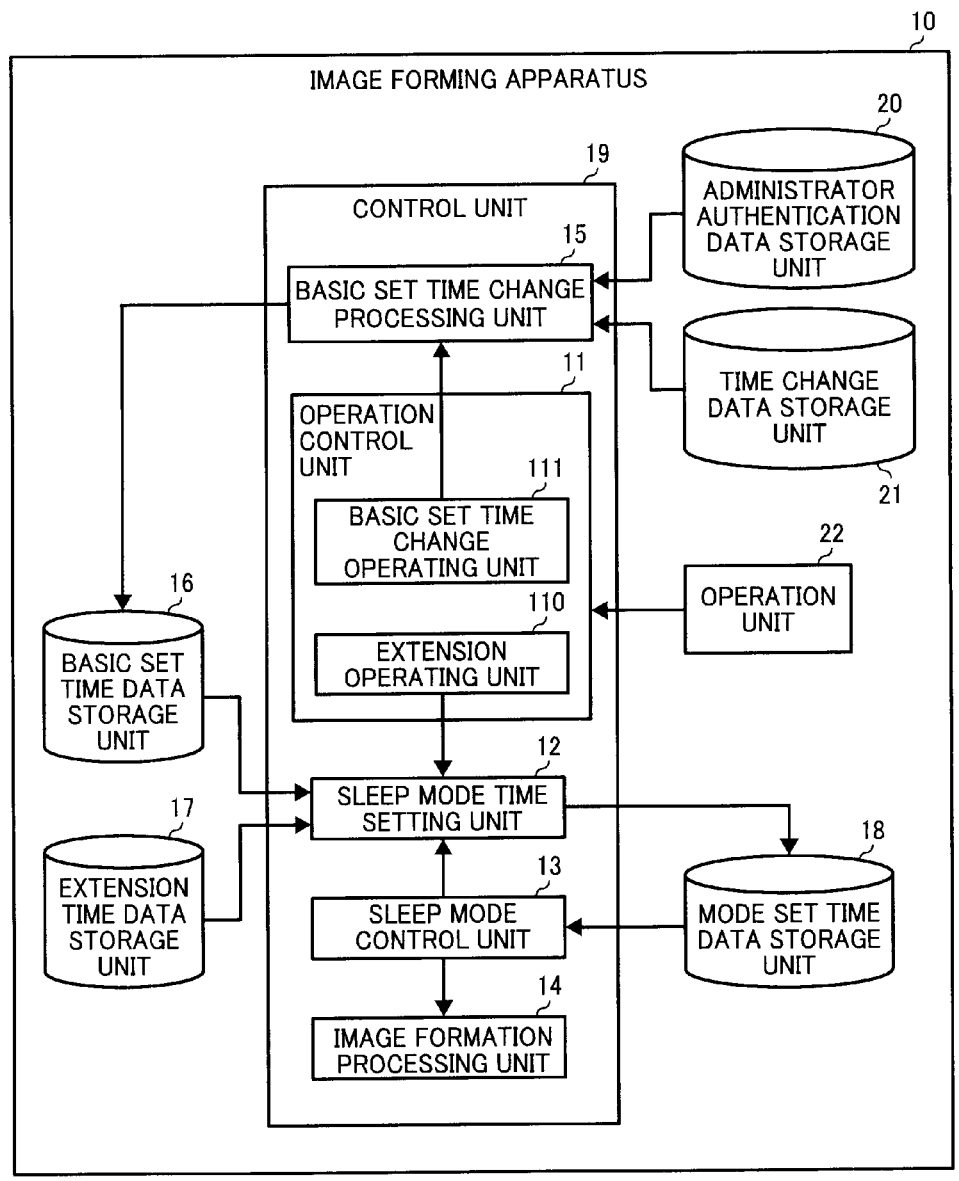
FIG. 1 is a block diagram showing an internal configuration of an image forming apparatus according to embodiments of the present invention.

Next, the configuration of the image forming apparatus 10 will be explained by using FIG. 1. As shown in FIG. 1, the image forming apparatus 10 is provided with a control unit 19, a basic set time data storage unit 16, an extension time data storage unit 17, a mode set time data storage unit 18, an administrator authentication data storage unit 20, and a time change data storage unit 21.

Figure 5:
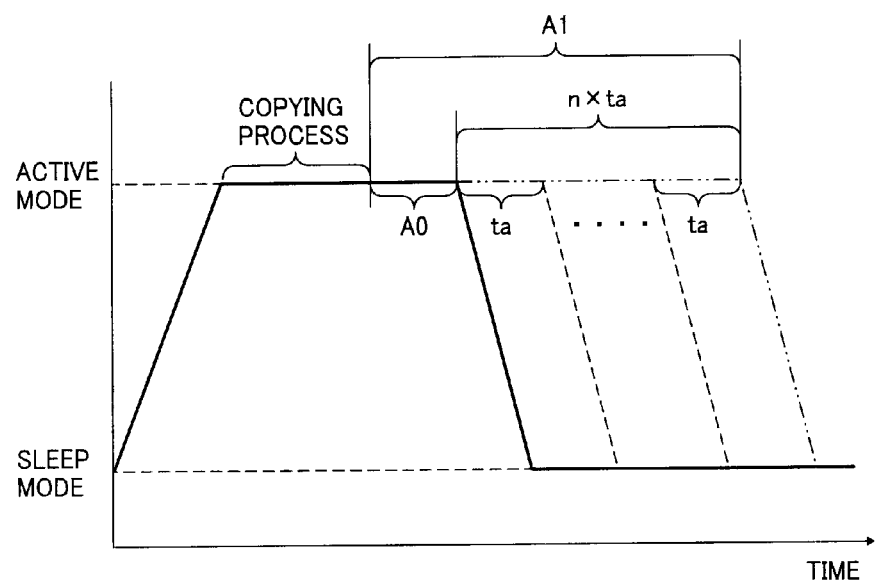
FIG. 5 is a conceptual diagram explaining the basic set time changing process in the first embodiment.

The control unit 19 has a CPU, RAM and ROM, etc. which are not shown and carries out various processes (processes including a mode control step, an extension process step and recovery process step, etc.) which will be described later. The basic set time data storage unit 16 stores the data about the basic set time. In the present embodiment, the shortest mode set time is stored as the basic set time upon shipment of the image forming apparatus 10. The extension time data storage unit 17 stores the data about extension time of the mode set time. In the present embodiment, the extension time is the time that is added to the basic set time. The mode set time data storage unit 18 stores the data about the mode set time that is currently set. The mode set time is changed by the control unit 19. The administrator authentication data storage unit 20 stores administrator authentication data for authenticating administrators who have the authority to change the basic set time. When authentication data about a new administrator is registered, the administrator authentication data thereof is recorded in the administrator authentication data storage unit 20. The administrator authentication data includes the data about a user identifier and a password of the administrator. A user identifier data area and a password data area store the data about user identifiers for specifying the administrators and passwords used by the administrators. The time change data storage unit 21 stores the data about unit change time, which is used when the basic set time is to be changed. In the present embodiment, as shown in FIG. 5, the unit change time ta, which is added every time a time change directing button is pressed down one time is recorded.

Next, the configuration of the control unit 19 in the image forming apparatus 10 will be explained by using FIG. 1. The control unit 19 is provided with an operation control unit 11, a sleep mode time setting unit 12, a sleep mode control unit 13, an image formation processing unit 14, and a basic set time change processing unit 15.

The operation control unit 11 is connected to an operation unit 22 such as a touch panel, operation buttons, etc. provided on the image forming apparatus 10. The operation buttons include an extension directing button for extending the mode set time by the user, a time change directing button for giving a time changing direction of the basic set time by the administrator, and so on. The operation control unit 11 executes input/output control processes of an operation screen of the operation unit 22 and processes to acquire signals from the operation unit 22. The operation control unit 11 includes an extension operating unit 110 and a basic set time change operating unit 111. When the extension operating unit 110 detects press-down of the extension directing button, the extension operating unit 110 supplies an extension directing signal to the sleep mode time setting unit 12. When the basic set time change operating unit 111 detects press-down of the time change directing button, the basic set time change operating unit 111 supplies a time change directing signal and the data about the number of times of the press-down of the time change directing button (the number of times of press-down) to the basic set time change processing unit 15.

The sleep mode time setting unit 12 executes a sleep mode time managing process. Specifically, when the sleep mode time setting unit 12 receives the extension signal from the extension operating unit 110, the sleep mode time setting unit 12 sets new mode set time. The sleep mode time setting unit 12 calculates the mode set time, which is obtained by adding the extension time to the basic set time, and records the mode set time in the mode set time data storage unit 18. Furthermore, when a transition to the sleep mode which is caused by elapse of the extended mode set time is detected, the sleep mode time setting unit 12 records the basic set time, which is stored in the basic set time data storage unit 16, as the mode set time in the mode set time data storage unit 18. Thus, the mode set time returns to the reference value (basic set time).

The sleep mode control unit 13 controls the operating mode (starting and canceling of the sleep mode) of the image formation processing unit 14. Specifically, the sleep mode control unit 13 executes a sleep mode starting process and a sleep mode canceling process. In the sleep mode starting process, the sleep mode control unit 13 measures the time elapsed from termination of a directed process and, if the time is over the mode set time, causes the image formation processing unit 14 to transition to the sleep mode. Furthermore, in this case, the sleep mode control unit 13 notifies the sleep mode time setting unit 12 that the sleep mode has been started. On the other hand, in the sleep mode canceling process, when the sleep mode control unit 13 acquires a sleep mode canceling signal, the sleep mode control unit 13 cancels the sleep mode and changes it to the active mode. In the present embodiment, a press-down detection signal of a canceling button, a process execution directing signal, etc. are used as the sleep mode canceling signal.

The image formation processing unit 14 controls the image forming units which carry out image forming processes. The image formation processing unit 14 takes either one of the two operating states, the active mode and the sleep mode, in accordance with control by the sleep mode control unit 13. Then, the image formation processing unit 14 controls power supply to the image forming units in accordance with the operating state.

The basic set time change processing unit 15 executes a process to change the basic set time in accordance with the time change directing signal received from the basic set time change operating unit 111. In this case, the basic set time change processing unit 15 carries out user authentication in order to confirm that it is a direction by the administrator who has the time changing authority. Then, only when the user authentication is correctly completed, the basic set time change processing unit 15 changes the basic set time. Also, the basic set time change processing unit 15 stores the shortest time of the mode set time.

(Sleep Mode Starting Process)

Figure 2:
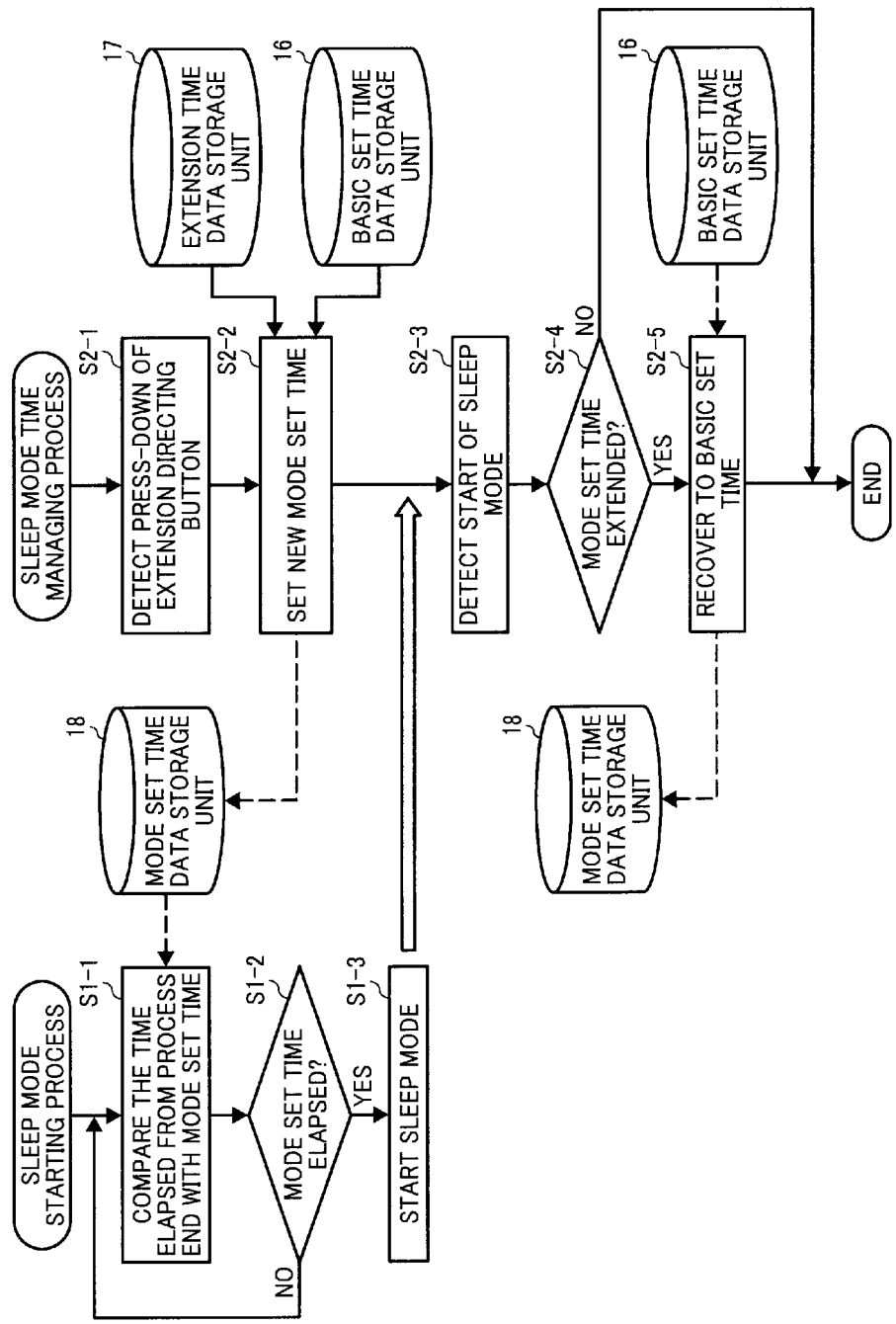
FIG. 2 is a flow chart explaining processing procedures of a sleep mode starting process and a sleep mode time managing process in a first embodiment.

Next, the sleep mode starting process in the above described image forming apparatus 10 will be explained by using FIG. 2. The control unit 19 of the image forming apparatus 10 executes various processes such as copying processes and printing processes. Specifically, the image formation processing unit 14 of the control unit 19 controls the image forming units so as to execute the various processes. Then, when a series of controls of the image forming units are completed, the image formation processing unit 14 supplies a process termination signal to the sleep mode control unit 13. The sleep mode control unit 13, which has detected the process termination, measures the elapsed time from this point.

Then, the control unit 19 executes a comparing process of the time elapsed from the process termination and the mode set time (step S1-1). Specifically, the sleep mode control unit 13 of the control unit 19 compares the mode set time, which is recorded in the mode set time data storage unit 18, with the time elapsed from the process termination. Then, when the time elapsed from the process termination passes over the mode set time ("YES" in step S1-2), the control unit 19 starts the sleep mode (step S1-3). Specifically, in accordance with the transition to the sleep mode, the sleep mode control unit 13 of the control unit 19 stops the power supply to the image forming units which are not relevant to signal transmission and reception. Then, the sleep mode control unit 13 notifies the sleep mode time setting unit 12 of the start of the sleep mode. In the manner described above, the sleep mode starting process is terminated.

(Sleep Mode Time Managing Process)

Next, the sleep mode time managing process, which is carried out when a user presses down the extension directing button, will be explained by using FIG. 2. For example, when the image forming apparatus 10 is to be used in a series of operating processes with short time intervals therebetween, the user presses down the extension directing button since the user desires to maintain the active mode longer than the normal mode set time. In this case, the extension operating unit 110 of the operation control unit 11 detects the press-down of the extension directing button (step S2-1) and supplies an extension directing signal to the sleep mode time setting unit 12. The sleep mode time setting unit 12, which has acquired the extension directing signal, executes a setting process of new mode set time (step S2-2). Specifically, the sleep mode time setting unit 12 acquires the basic set time from the basic set time data storage unit 16 and acquires the extension time from the extension time data storage unit 17. Then, the sleep mode time setting unit 12 adds the extracted extension time to the basic set time, thereby calculating new mode set time E. Next, the sleep mode time setting unit 12 records the calculated mode set time in the mode set time data storage unit 18. In this case, the sleep mode time setting unit 12 temporarily stores an extension flag, which indicates that the sleep mode time has been extended, in a memory of the control unit.

Then, the above described sleep mode starting process is executed (steps S1-1 to S1-3). Specifically, the sleep mode control unit 13 carries out the comparison between the time elapsed from the process termination and the mode set time (step S1-1) and, when the elapsed time passes over the mode set time ("YES" in step S1-2), starts the sleep mode (step S1-3). Then, when the sleep mode is started, the data about the sleep mode start is supplied from the sleep mode control unit 13 to the sleep mode time setting unit 12. Consequently, the sleep mode time setting unit 12 detects the sleep mode start (step S2-3). Herein, the sleep mode time setting unit 12 determines whether the mode set time has been extended or not (step S2-4). Specifically, when the extension flag is recorded in the memory, it is determined that the mode set time has been extended. In this case ("YES" in step S2-4), the sleep mode time setting unit 12 executes a process of recovery to the basic set time (step S2-5). Specifically, the sleep mode time setting unit 12 extracts the basic set time, which is stored in the basic set time data storage unit 16, and records the basic set time in the mode set time data storage unit 18 as new mode set time. In the manner described above, the sleep mode time managing process is terminated.

(Basic Set Time Changing Process)

Figure 4:
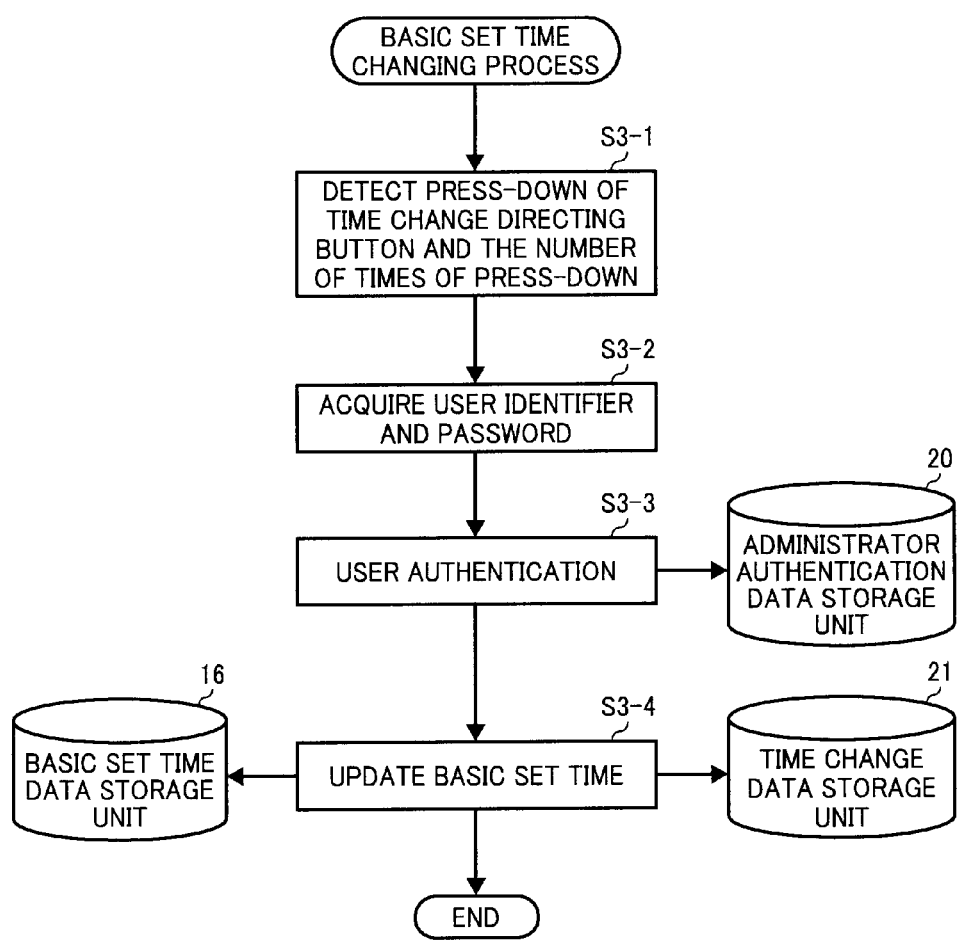
FIG. 4 is a flow chart explaining a processing procedure of a basic set time changing process in the first embodiment.

Next, a basic set time changing process of changing the basic set time will be explained by using FIG. 4. First, the control unit 19 of the image forming apparatus 10 executes a process of detecting press-down of the time change directing button and the number of times of the press-down (step S3-1). Specifically, when the administrator is to change the basic set time, the time change directing button is pressed down. In this case, when the operation control unit 11 of the control unit 19 detects the press-down of the time change directing button, the operation control unit 11 counts the number of times n of press-down and supplies the time change directing signal and the data about the number of times n of press-down to the basic set time change processing unit 15. Next, the control unit 19 executes a process of acquiring the identifier and the password of the user (step S3-2). Specifically, the basic set time change processing unit 15, which has received the time change directing signal, displays an authentication screen on the touch panel. The authentication screen includes input fields for inputting the user identifier and the password, respectively, and an authentication execution button. The administrator inputs the user identifier and the password of himself/herself into the input fields of the authentication screen by using the touch panel or operation buttons and presses down the authentication execution button.

Next, the control unit 19 executes user authentication (step S3-3). Specifically, the basic set time change processing unit 15 of the control unit 19 searches the administrator authentication data matching the acquired user identifier and password from the administrator authentication data storage unit 20. In this case, if the corresponding administrator authentication data cannot be detected, the control unit 19 displays the message that the basic set time cannot be changed, which is displayed on the touch panel. On the other hand, if the corresponding administrator authentication data is detected and user authentication is completed, the basic set time change processing unit 15 executes an updating process of the basic set time (step S3-4). Specifically, the basic set time change processing unit 15 acquires the data about the unit change time ta from the time change data storage unit 21. As shown in FIG. 5, the basic set time change processing unit 15 calculates the time that is obtained by multiplying the unit change time ta by the number of times n of press-down and adds this time to the shortest time A0 of the mode set time, thereby calculating new basic set time A1. Then, the basic set time change processing unit 15 records the calculated new basic set time A1 in the basic set time data storage unit 16. In the manner described above, the basic set time changing process is terminated.

According to the present embodiment, effects as described below can be obtained.

(1) In the present embodiment, when the user presses down the extension directing button, the control unit 19 of the image forming apparatus 10 detects the press-down of the extension directing button (step S2-1) and executes the setting process of new mode set time (step S2-2). In this case, the control unit 19 calculates the new mode set time by adding the extension time extracted from the extension time data storage unit 17 to the basic set time acquired from the basic set time data storage unit 16 and records the new mode set time in the mode set time data storage unit 18. Then, when start of the sleep mode is detected (step S2-3), the control unit 19 executes the process of recovery to the basic set time (step S2-5) when the mode set time is extended (when "YES" in step S2-4). In this case, the control unit 19 records the basic set time, which has been extracted from the basic set time data storage unit 16, in the mode set time data storage unit 18 as the new mode set time. Therefore, in the image forming apparatus 10, since the mode set time can be temporarily extended in accordance with needs of the user, the basic set time, which is normal mode set time, can be set to be short. Furthermore, when the extended mode set time elapses and the mode is switched to the sleep mode, the mode set time is automatically returned to the basic set time. Therefore, except the case in which it is temporarily extended, the basic set time can be always used as the mode set time. Therefore, the time of the sleep mode can be lengthened, and power can be saved more.

(2) In the present embodiment, when the administrator who desires to change the basic set time presses down the time change directing button, the control unit 19 of the image forming apparatus 10 executes the detecting process of the press-down of the time change directing button and the number of times of the press-down (step S3-1) and executes the updating process of the basic set time (step S3-4). Therefore, in accordance with the usage state of the image forming apparatus 10, the basic set time can be changed to the time that reduces waiting time, is user friendly, and contributes to power saving more.

(3) In the present embodiment, when the time change directing button is pressed down, the control unit 19 of the image forming apparatus 10 executes the acquisition process of the user identifier and the password (step S3-2) and executes user authentication (step S3-3). When the user authentication is correctly completed, the control unit 19 executes the updating process of the basic set time (step S3-4). Therefore, the users other than the administrators cannot freely change the basic set time. Therefore, since the basic set time cannot be easily lengthened, the short mode set time can be maintained, and power can be further saved.

(4) In the present embodiment, in the updating process of the basic set time (step S3-4), the control unit 19 of the image forming apparatus 10 calculates the time which is obtained by multiplying the unit change time ta acquired from the time change data storage unit 21 by the number of times n of press-down and adds this time to the shortest time A0, thereby calculating the new basic set time A1. Therefore, the administrator can easily change the basic set time by pressing down the time change directing button in accordance with the length of the time to be extended.

(Second Embodiment)

Next, a second embodiment of the present invention will be explained with reference to FIG. 1, FIG. 2, FIG. 6, and FIG. 7. In the below embodiment, the parts same as that of the above described first embodiment are denoted by the same reference numerals, and detailed explanations thereof will be omitted. The present embodiment is different from the above described first embodiment in that the sleep mode time setting unit 12 changes the extension time in accordance with the number of times of press-down of the extension directing button. Specifically, in the present embodiment, as shown in FIG. 7, unit extension time te, which is added every time the extension directing button is pressed down one time, is recorded in the extension time data storage unit 17 as the data about extension time. When the extension operating unit 110 of the operation control unit 11 detects press-down of the extension directing button, the extension operating unit 110 supplies an extension directing signal and the data about the number of times of the press-down of the extension directing button (the number of times of press-down) to the sleep mode time setting unit 12. The sleep mode time setting unit 12 calculates extension time by multiplying the acquired number of times n of press down by the unit extension time te, calculates new mode set time E1 by adding the extension time to the basic set time A, and records the mode set time in the mode set time data storage unit 18.

Figure 6:
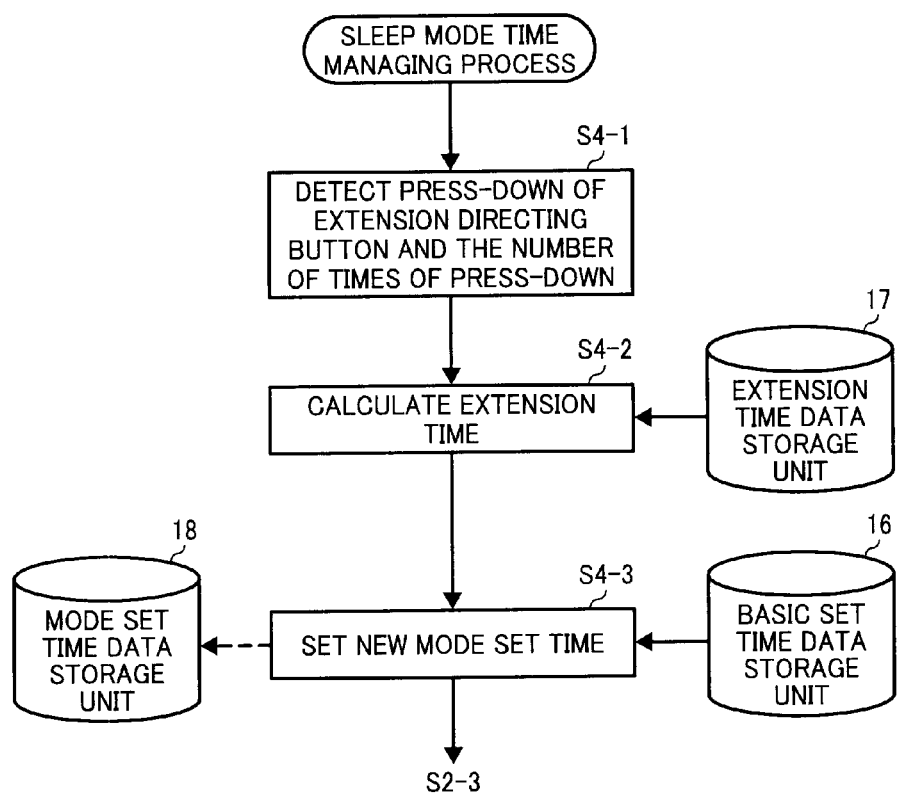
FIG. 6 is a flow chart explaining a processing procedure of a sleep mode time managing process in a second embodiment.
Figure 7:
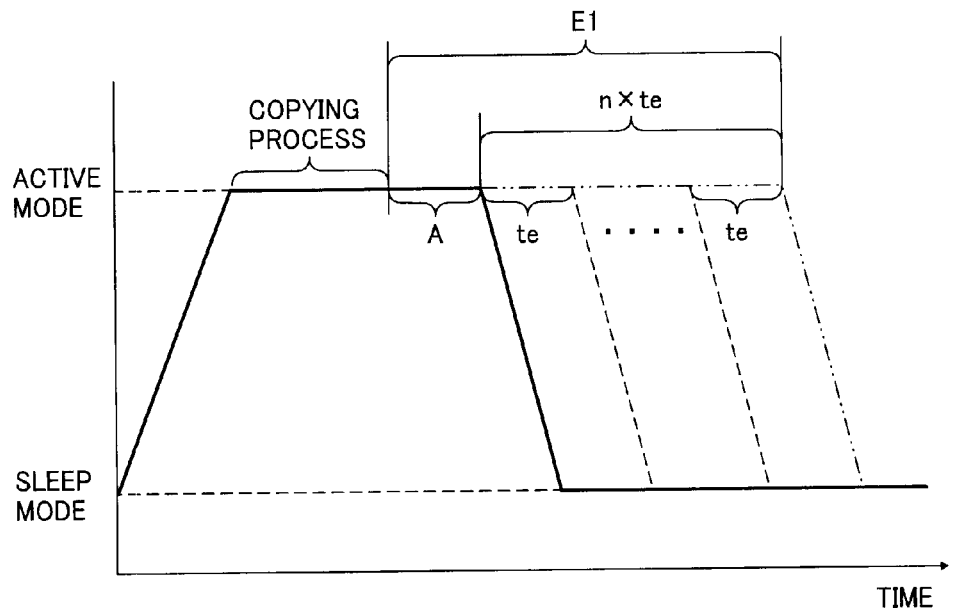
FIG. 7 is a conceptual diagram explaining the sleep mode time managing process in the second embodiment.

Then, in the image forming apparatus 10 of the present embodiment, instead of steps S2-1 and S2-2 in the sleep mode time managing process in the above described first embodiment, steps S4-1 to S4-3 shown in FIG. 6 are executed. Specifically, the user who desires to maintain the active mode longer than the normal mode set time presses down the extension directing button successively by the number of times corresponding to the time desired to be extended. Herein, when the mode set time is desired to be extended more, the number of times of press-down of the extension directing button is increased. In this case, the extension operating unit 110 of the operation control unit 11 detects the press-down of the extension directing button and the number of times of the press-down (step S4-1) and supplies the extension directing signal and the data about the counted number of times n of the press-down to the sleep mode time setting unit 12. Next, the sleep mode time setting unit 12 executes a calculation process of the extension time (step S4-2). Specifically, the sleep mode time setting unit 12 acquires the unit extension time te from the extension time data storage unit 17. Then, as shown in FIG. 7, the sleep mode time setting unit 12 calculates the extension time by multiplying the acquired unit extension time te by the number of times n of press-down. Next, the sleep mode time setting unit 12 executes a setting process of new mode set time (step S4-3). Specifically, the sleep mode time setting unit 12 extracts the basic set time from the basic set time data storage unit 16. Then, the sleep mode time setting unit 12 adds the extension time (n×te), which is calculated in step S4-2, to the acquired basic set time A, thereby calculating the new mode set time E1, and records the new mode set time in the mode set time data storage unit 18. As a result, the mode set time is extended. In this case, the sleep mode time setting unit 12 temporarily stores an extension flag, which indicates that the sleep mode time is extended, in the memory.

Then, as well as the above described first embodiment, the control unit 19 of the image forming apparatus 10 carries out steps S2-3 to S2-5 of the sleep mode starting process and the sleep mode time managing process. According to the present embodiment, in addition to the above described effects of (1) to (4), below effects can be obtained.

(5) In the present embodiment, the control unit 19 of the image forming apparatus 10 counts the number of times n of press-down of the extension button, calculates the extension time in accordance with the number (step S4-2), and executes the setting process of the new mode set time by using the extension time (step S4-3). Therefore, the user presses down the extension directing button by the number of times of press-down corresponding to the time that he/she desires to extend. Therefore, when the mode set time is desired to be extended just a little, the time can be extended by the amount corresponding to that. Therefore, excessive extension time can be omitted, and the time of the power saving mode can be extended.

The above described embodiments can be modified in the below manners.

In the above described embodiments, when the extension flag is recorded in the memory, the sleep mode time setting unit 12 determines that the mode set time is extended ("YES" in step S2-4). The method of determining whether the mode set time is extended or not is not limited to this. For example, the sleep mode time setting unit 12 may determine it by comparing the current mode set time recorded in the mode set time data storage unit 18 with the basic set time stored in the basic set time data storage unit 16. Then, when the current mode set time is not matching the basic set time, it is determined that the mode set time is extended. In this case, the extension flag is not required to be recorded in the memory. In the above described first embodiment, the time to be added to the basic set time is recorded in the extension time data storage unit 17; however, instead of that, the mode set time E of the point of extension may be stored. In this case, the sleep mode time setting unit 12 is merely required to record the extension time, which is acquired from the extension time data storage unit 17, in the mode set time data storage unit 18; therefore, the mode set time E is not required to be calculated.

In the above described first embodiment, the image forming apparatus 10 is provided with the operation buttons including the extension directing button for extending the mode set time by a user, the time change directing button for giving a time changing direction of the basic set time by an administrator, etc. Instead of them, the image forming apparatus 10 can be configured so that the functions of the extension directing button and the time change directing button are realized by one control button. In this case, when the control button is pressed down merely one time, the operation control unit 11 detects the press-down of the extension directing button and outputs the extension directing signal. When the control button is successively pressed down plural times, the operation control unit 11 detects press-down of the time change directing button and outputs the time change directing signal.

In the above described second embodiment, the user presses down the extension directing button by the number of times corresponding to the time he/she desires to extend. Then, the control unit 19 of the image forming apparatus 10 detects the press-down of the extension directing button and the number of times of press-down (step S4-1) and executes the calculating process of the extension time by multiplying the number of times of press-down by the unit extension time te (step S4-2). In addition to this, when the extended mode set time is recorded in the mode set time data storage unit 18, the mode set time may be further extended. For example, in the case in which a series of copying processes are being carried out with short time intervals therebetween, if preparation of the next copying process takes time, the user may successively press down the extension directing button again immediately before the extended mode set time elapses. In this case, the control unit 19 of the image forming apparatus 10 determines whether the mode set time is extended or not at the present point. If it is determined to be extended, the control unit 19 calculates additional extension time by multiplying the number of times of the press-down of the extension directing button by the unit extension time te. Then, the control unit 19 calculates new mode set time by adding the additional extension time to the current mode set time and records the new mode set time in the mode set time data storage unit 18. As a result, the mode set time can be further extended in accordance with the usage state.

In the basic set time changing process of the above described embodiments, the control unit 19 of the image forming apparatus 10 detects the press-down of the time change directing button and the number of times of the press-down (step S3-1), then, executes the acquisition process of the user identifier and the password (step S3-2), and executes the user authentication (step S3-3). When the detection of the press-down of the time change directing button and the user authentication is to be carried out, the order of execution of the steps thereof is not limited to the above described order. For example, the press-down of the time change directing button may be detected after the user authentication is executed. In this case, the control unit 19 may display the time change directing button on the touch panel after the user authentication is completed. Specifically, the administrator selects an item of "user authentication" on the touch panel, inputs the user identifier and the password of himself/herself, and selects the authentication execution button. The control unit 19 of the image forming apparatus 10 executes user authentication by using the acquired user identifier and password. When the user authentication is correctly completed, the time change directing button may be displayed on the touch panel. In this case, the data used in the user authentication (user identifier and password) is acquired by the input by the administrator; however, it may be acquired by another method. For example, a card reader may be connected to the image forming apparatus 10 so as to acquire the data used in user authentication from an IC card storing the data. Alternatively, biometric authentication such as fingerprints may be used.

Figure 8:
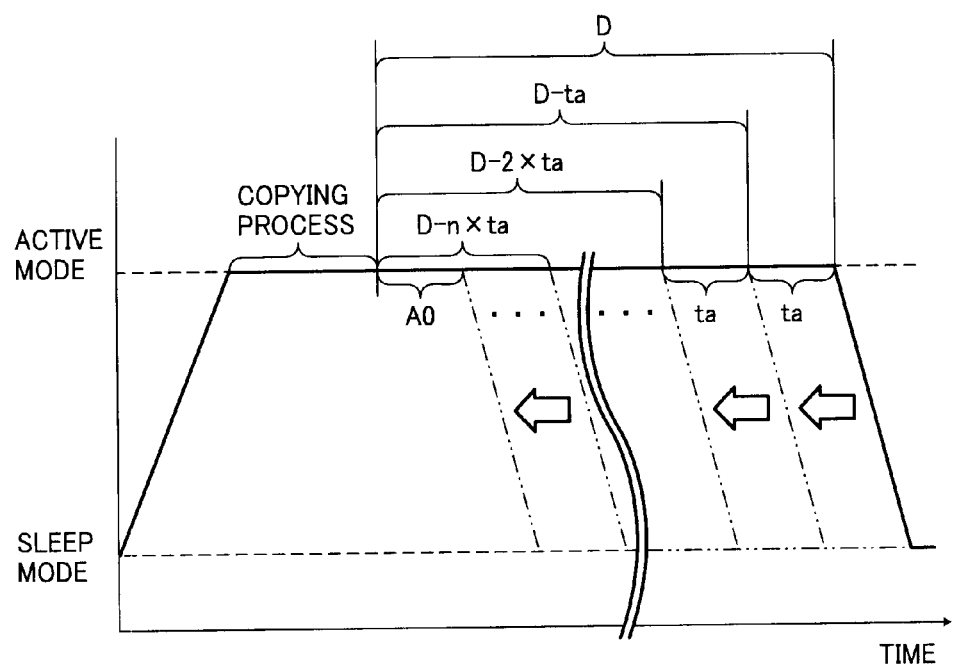
FIG. 8 is a conceptual diagram explaining a basic set time changing process in a modification example.

In the basic set time changing process of the above described embodiments, the control unit 19 of the image forming apparatus 10 executes the updating process of the basic set time (step S3-4). In this case, the time which is obtained by multiplying the unit change time ta by the number of times n of press-down is calculated, and the new basic set time A1 is calculated by adding the calculated time to the shortest time A0 of the mode set time. Herein, the calculation of the new basic set time may employ another method. For example, table data in which the number of times of press-down and the time that can be set as the basic set time are mutually associated may be stored in the time change data storage unit 21 so that the control unit 19 determines the basic set time corresponding to the detected number of times of press down by using the table. The table data as described above may be used also in acquisition of the mode set time. For example, the table data in which the number of times of press-down and extension time are mutually associated is stored in the extension time data storage unit 17, and the control unit 19 may read and acquire the extension time corresponding to the detected number of times of press down from the table. Alternatively, as shown in FIG. 8, the value (D-n×ta) obtained by subtracting the value (n×ta), which is obtained by multiplying the number of times n of press-down of the time change directing button by the unit change time ta, from maximum mode set time D may be used as the new basic set time.

Alternatively, the control unit 19 may gradually shorten the basic set time at every constant time period. For example, the basic set time change processing unit 15 of the control unit 19 stores change timing time for shortening the basic set time and change time at which the basic set time is set. Then, when the time elapsed from the change time passes over the change timing time, new basic set time, which is obtained by subtracting the unit change time ta from the current basic set time, is recorded in the basic set time data storage unit 16, and the time at this point is recorded as change time. Then, by repeating this, it can be finally changed to the shortest basic set time by gradually shortening the basic set time. Alternatively, a change timing button may be provided in the operation unit 22 so that the new basic set time, which is obtained by subtracting the unit change time ta from the current basic set time, is recorded in the basic set time data storage unit 16 every time the administrator presses down the change timing button. In this case, as the user becomes accustomed to this, the mode set time can be gradually shortened. Therefore, finally, the shortest mode set time can be set without causing discomfort to the user.

A recording medium storing programs and data for realizing the electronic device of the present invention may use, specifically, CD-ROMs (-R/-RW), magneto optical disks, DVD-ROMs, FDs, flash memories, memory cards, memory sticks, other various ROMs and RAMs, etc. The electronic device which execute the above described processes may be formed by distributing the recording medium and installing the programs, etc. to an electronic device. Alternatively, the programs, etc. may be stored in a disk apparatus possessed by a server apparatus on a network such as the Internet so that, for example, they are downloaded to an electronic device by superimposing them on carrier waves.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2008-231335 filed on Sep. 9, 2008 and including specification, claims, drawings and summary. The disclosure of the above Japanese Patent Application is incorporated herein by reference in its entirety.

What is claimed is:

1. An electronic device comprising:
a control unit connected to a process executing unit executing a directed information process;
a set time data storage unit recording data about a mode set time taken until a transition to a power saving mode consuming small power after the information process in the process executing unit is finished;
a basic set time data storage unit recording data about a basic set time;
an extension time data storage unit recording data about an extension time; and
an operation unit; wherein
the control unit includes:
a mode control unit which measures the time elapsed from an end of the information process and, when the elapsed time passes over the mode set time recorded in the set time data storage unit, causes the process executing unit to transition to the power saving mode;
an extension processing unit which, when an extension direction of the mode set time is detected via the operation unit, calculates an extended mode set time by using the extension time recorded in the extension time data storage unit and records the calculated mode set time in the set time data storage unit; and
a recovery processing unit which, when transition to the power saving mode is made in the case in which the extended mode set time is stored in the set time data storage unit, records the basic set time, which is recorded in the basic set time data storage unit, in the set time data storage unit, wherein:
the operation unit includes an extension directing button;
the extension time data storage unit stores data about a unit extension time of the case in which the extension directing button is pressed down one time;
the extension processing unit detects an extension direction when the extension directing button is pressed down, detects the number of times of the press-down when the extension directing button is pressed down, calculates the extension time by multiplying the number of times of the press-down by the unit extension time stored in the extension time data storage unit, and calculates the extended mode set time by adding the extension time to the basic set time;
the mode set time and the basic set time are calculated based on the elapsed time from the end of the information process measured by the control unit;
the basic set time data storage unit stores a change timing time for shortening the basic set time and a change time at which the basic set time is set; and
the extension processing unit calculates a new basic set time by subtracting a predetermined time from a current basic set time when the time elapsed from the change time passes over the change timing time, and stores the new basic set time calculated to the basic set time data storage unit as the change time.

2. The electronic device according to claim 1, wherein the control unit further includes a basic set time changing unit which executes a changing process of changing the basic set time when a time changing direction is detected via the operation unit.

3. The electronic device according to claim 2, wherein the control unit is connected to an authentication data storage unit storing authentication data about an administrator who has authority to change the basic set time; and
the basic set time changing unit acquires authentication data of a user after the time changing direction is detected and, when the authentication data of the user matches the authentication data recorded in the authentication data storage unit, executes the changing process.

4. The electronic device according to claim 1, wherein: the extension processing unit further extends the mode set time when the extended mode set time is stored in the extension time data storage unit.

5. An electronic device switching an operating mode to a power saving mode when a predetermined time elapses, the electronic device comprising:
a data storage unit storing a mode set time which is a waiting time taken until the operating mode is switched to the power saving mode;
a basic set time data storage unit recording data about a basic set time;
an extension processing unit for extending the mode set time by a predetermined time and storing the extended mode set time in the data storage unit when an extension directing operation is carried out after an end of an image formation process and before elapse of the mode set time;
a mode control unit switching the operating mode of the electronic device to the power saving mode when the mode set time elapses after the end of the image formation process;
a recovery processing unit returning the mode set time to a reference value after the operating mode is switched to the power saving mode by the mode control unit; and
an operation unit which includes an extension directing button,
wherein:
the data storage unit stores data about a unit extension time of the case in which the extension directing button is pressed down one time;
the extension processing unit detects an extension direction when the extension directing button is pressed down, detects the number of times of the press-down when the extension directing button is pressed down, calculates the extension time by multiplying the number of times of the press-down by the unit extension time stored in the data storage unit, and calculates the extended mode set time by adding the extension time to a basic set time stored in the basic set time data storage unit;
the mode set time and the basic set time are calculated based on the elapsed time from the end of the information process;
the basic set time data storage unit stores a change timing time for shortening the basic set time and a change time at which the basic set time is set, and
the extension processing unit calculates a new basic set time by subtracting a predetermined time from a current basic set time when the time elapsed from the change time passes over the change timing time, and stores the new basic set time calculated to the basic set time data storage unit as the change time.

6. A method for controlling an electronic device comprising: a control unit connected to a process executing unit executing a directed information process, a set time data storage unit recording data about mode set time taken until transition to a power saving mode consuming a small power after the information process in the process executing unit is finished, a basic set time data storage unit recording data about a basic set time, an extension time data storage unit recording data about an extension time, and an operation unit which includes an extension directing button; wherein the control unit executes:
a mode control step of measuring the time elapsed from an end of the information process and, when the elapsed time passes over the mode set time recorded in the set time data storage unit, causing the process executing unit to transition to the power saving mode;
an extension processing step of, when an extension direction of the mode set time is detected via the operation unit, calculating extended mode set time by using the extension time recorded in the extension time data storage unit and recording the calculated mode set time in the set time data storage unit;
a recovery processing step of, when transition to the power saving mode is made in the case in which the extended mode set time is stored in the set time data storage unit, recording the basic set time, which is recorded in the basic set time data storage unit, in the set time data storage unit;
storing data about a unit extension time of the case in which the extension directing button is pressed down one time; and
detecting an extension direction when the extension directing button is pressed down, detecting the number of times of the press-down when the extension directing button is pressed down, calculating the extension time by multiplying the number of times of the press-down by the unit extension time stored in the data storage unit, and calculating the extended mode set time by adding the extension time to a basic set time,
wherein:
the mode set time and the basic set time are calculated based on the elapsed time from the end of the information process measured by the control unit;
a change timing time for shortening the basic set time and a change time at which the basic set time is set are stored in the basic set time data storage unit; and
the detecting further comprising calculating a new basic set time by subtracting a predetermined time from a current basic set time when the time elapsed from the change time passes over the change timing time, and stores the new basic set time calculated to the basic set time data storage unit as the change time.

7. A control method of an electronic device switching an operating mode to a power saving mode when a predetermined time elapses, the control method of the electronic device comprising:
a step of storing a mode set time which is a waiting time taken until the operating mode is switched to the power saving mode;
an extension processing step of extending the mode set time by a predetermined time and storing the extended mode set time when an extension directing operation is carried out after an end of an image formation process and before elapse of the mode set time;
a mode control step of switching the operating mode of the electronic device to the power saving mode when the mode set time elapses after the end of the image formation process;
a recovery processing step of returning the mode set time to a reference value after the operating mode is switched to the power saving mode in the mode control step,
storing data about a unit extension time of the case in which an extension directing button is pressed down one time; and
detecting an extension direction when the extension directing button is pressed down, detecting the number of times of the press-down when the extension directing button is pressed down, calculating the extension time by multiplying the number of times of the press-down by the unit extension time stored in the data storage unit, and calculating the extended mode set time by adding the extension time to a basic set time, wherein:

the mode set time and the basic set time are calculated based on the elapsed time from the end of the information process;

a change timing time for shortening the basic set time and a change time at which the basic set time is set are stored in a basic set time data storage unit; and the detecting further comprising calculating a new basic set time by subtracting a predetermined time from a current basic set time when the time elapsed from the change time passes over the change timing time, and stores the new basic set time calculated to the basic set time data storage unit as the change time.

8. A recording medium storing a control program of an electronic device comprising a control unit connected to a process executing unit executing a directed information process, a set time data storage unit recording data about mode set time taken until transition to a power saving mode consuming a small power after the information process in the process executing unit is finished, a basic set time data storage unit recording data about a basic set time, an extension time data storage unit recording data about an extension time, and an operation unit which includes an extension directing button; wherein the recording medium stores a program for causing the control unit to function as:

a mode control unit which measures the time elapsed from an end of the information process and, when the elapsed time passes over the mode set time recorded in the set time data storage unit, causes the process executing unit to transition to the power saving mode;

an extension processing unit which, when an extension direction of the mode set time is detected via the operation unit, calculates an extended mode set time by using the extension time recorded in the extension time data storage unit and records the calculated mode set time in the set time data storage unit;

a recovery processing unit which, when transition to the power saving mode is made in the case in which the extended mode set time is stored in the set time data storage unit, records the basic set time, which is recorded in the basic set time data storage unit, in the set time data storage unit, wherein:

the extension time data storage unit stores data about a unit extension time of the case in which the extension directing button is pressed down one time;

the extension processing unit detects an extension direction when the extension directing button is pressed down, detects the number of times of the press-down when the extension directing button is pressed down, calculates the extension time by multiplying the number of times of the press-down by the unit extension time stored in the extension data data storage unit, and calculates the extended mode set time by adding the extension time to a basic set time;

the mode set time and the basic set time are calculated based on the elapsed time from the end of the information process measured by the control unit;

the basic set time data storage unit stores a change timing time for shortening the basic set time and a change time at which the basic set time is set; and the extension processing unit calculates a new basic set time by subtracting a predetermined time from a current basic set time when the time elapsed from the change time passes over the change timing time, and stores the new basic set time calculated to the basic set time data storage unit as the change time.

* * * * *